INVENTOR
MARTIN M. STERNAU

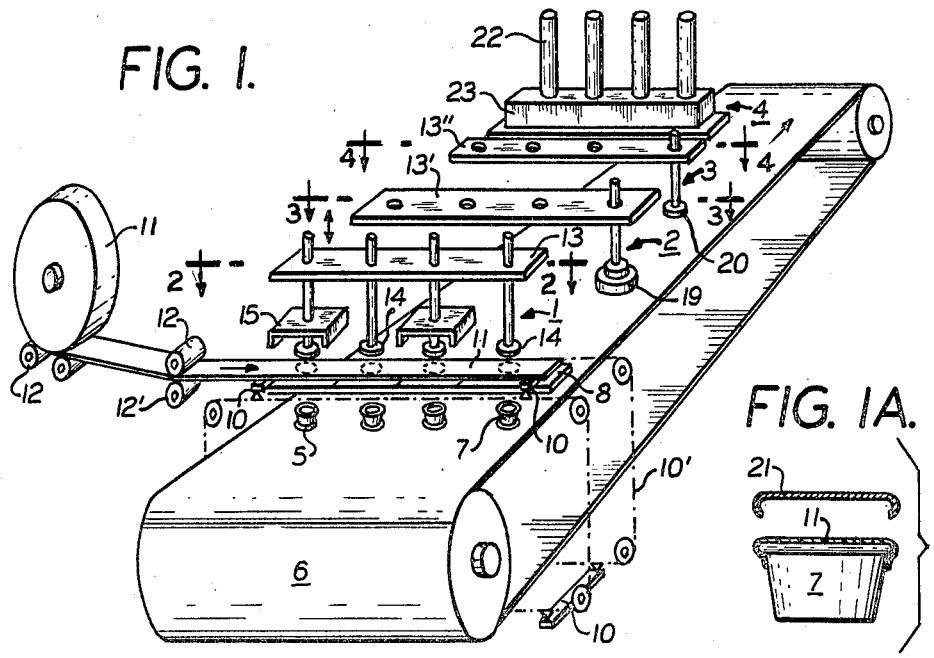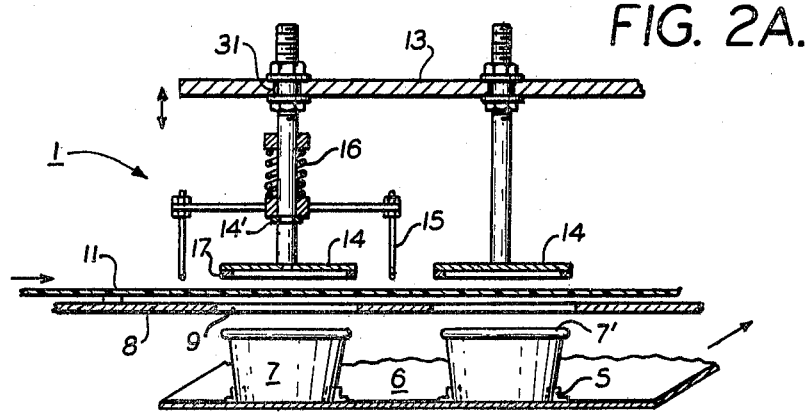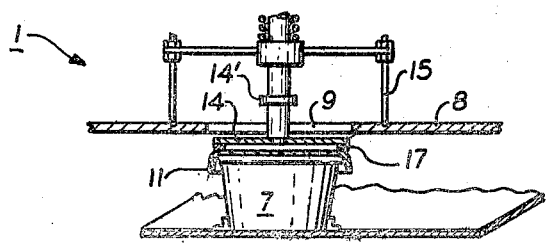

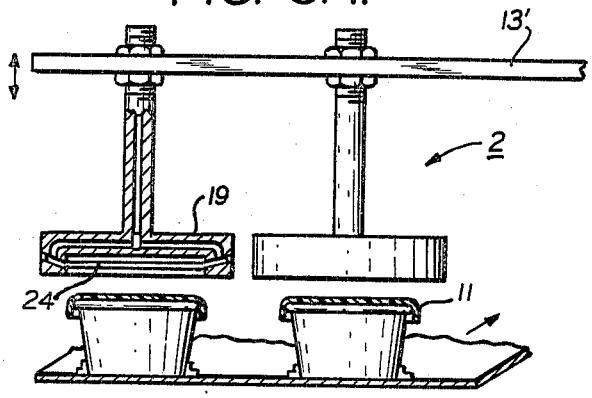
FIG. 3A.
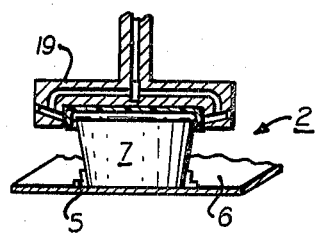
FIG. 3B.
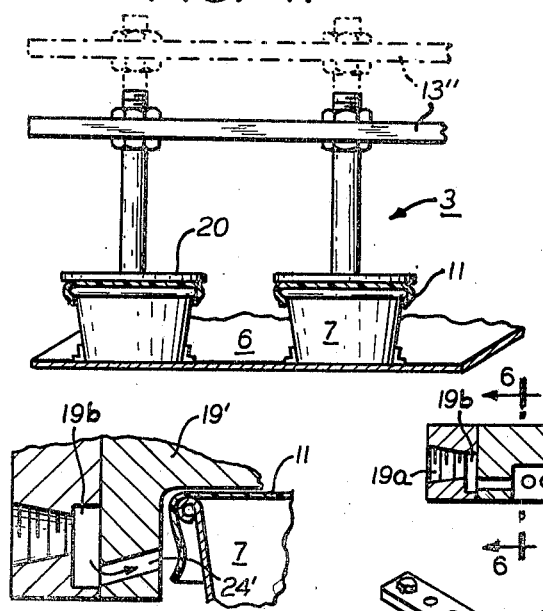
FIG. 4.
FIG. 6.
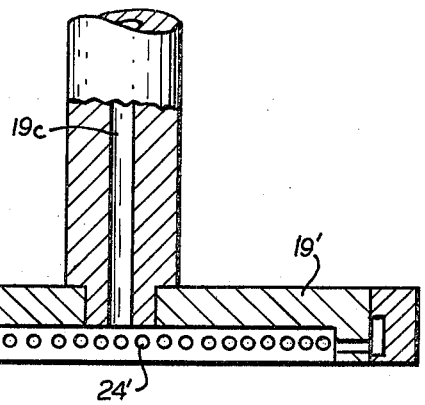
FIG. 5.
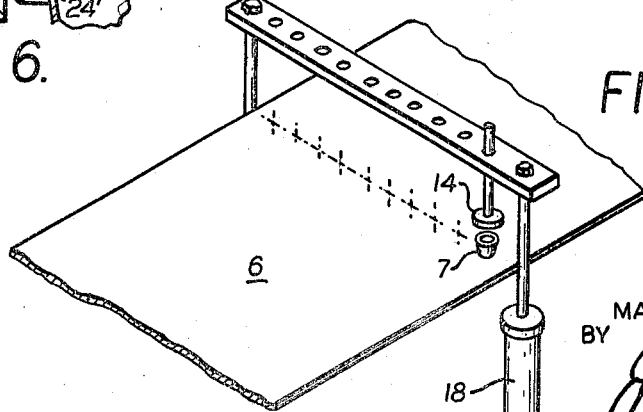
FIG. 7.
INVENTOR
MARTIN M. STERNAU
BY
ATTORNEYS.

United States Patent Office 3,491,510
Patented Jan. 27, 1970

3,491,510
**APPARATUS AND METHOD FOR SIMULTANE-
OUSLY MAKING CLOSURES AND SEALING
CONTAINERS**
Martin M. Sternau, Flushing, N.Y., assignor to
W. R. Grace & Co., Duncan, S.C., a corporation of Connecticut
Filed Aug. 1, 1967, Ser. No. 657,481
Int. Cl. B65b 7/28, 53/06
U.S. Cl. 53—42                                       5 Claims

ABSTRACT OF THE DISCLOSURE

This invention pertains to an apparatus, and to a method, for simultaneously capping and sealing containers, employing the method of selective or controlled shrinkage of heat shrinkable, oriented plastic film or sheet, by placing the film or sheet over the mouth of a filled container, the film being larger than the mouth of the container, and applying heat, selectively, first only to the extended edge of the film whereby to cause the edge of the film to shrink quickly, and second to the remaining portion of the film so as to form a closure hermetically sealing the container.

---

This application relates to an apparatus and method for making closures and sealing containers using heat shrinkable plastic film.

It is based on the following principle: When a piece of heat shrinkable, oriented plastic film is subjected to heat of any type, it will shrink and shrivel into an irregular ball-shaped configuration due to its inherent oriented characteristics. However, when the central or interior portion of the film is shielded or otherwise insulated from the direct or indirect influence of heat while the perimeter or rim area is subjected to heat, only the rim area of film will shrink and will be reduced, thereby being curled and producing a cap-shaped or cup-shaped configuration.

In the presence of a container, tub or cup, the film being larger than the mouth of the container and having been placed upon the mouth of the container, and retained thereon and shielded in the area of the mouth of the container, only the exposed edges or rim will shrink causing the edges of the film to curl. The edges will continue to shrink until the curled edge portion of the film is physically restrained by the rim of the container, whereby to form a cap-shaped closure or cover with an expansible or elastic bead or band upon the container. This closure will tightly conform to the mouth of the container regardless of its shape since the film will always assume the configuration of the container mouth, be it round, oval, rectangular, or any other shape. If heat is thereafter applied to the center portion of the film which previously had been shielded, that is, the portion within the area defined by the rim of the container, this central area will then shrink and become tight whereby the cap or cover originally formed will form a still tighter hermetical seal around the container.

In view of the above statements, it follows that one of the objects of this invention is to provide an apparatus, and a method, for performing selective shrinkage of a draped or unformed piece of heat shrinkable, oriented plastic film or sheet to form a closure directly upon a container and simultaneously seal the container.

Another of the objects of this invention is to provide an apparatus, machine, or device for performing the method of selective shrinkage of heat shrinkable, oriented plastic film to form a closure directly upon a container and simultaneously to seal the container, i.e., the forming and sealing occurring at the identical instant, said apparatus having means for cutting a piece of film, means for placing said film on top of the mouth of a filled container, means for applying heat, selectively, to the rim area of the film, means for shielding the center portion of the film while heat is applied to its peripheral area, means for thereafter applying heat to the center portion of the film, and transporting means for the filled container before and after sealing.

A further object of this invention is to provide a closure formed by a machine, and a method, using a transparent (preferably), heat shrinkable, oriented plastic film or sheet, which film is thin, fragile, flexible, limp, drapable (preferably), unformed plastic of any type. Heat shrinkable films that are normally less than .002" thick and capable of large shrinkage in all directions parallel to the film surfaces are particularly applicable. Actually films in the range of .0002" (20 gauge) to .0008" (80 gauge) are generally satisfactory and may be used. The thickness of the film, of course, will depend somewhat upon the area to be covered. However, it is within the scope of my invention to use any type film that is shrinkable in only one direction as well as in two directions (e.g., an oriented film of the so-called tensilized or cross-tensilized type) which could be used on containers of any particular form, such as on a circular or rectangular container.

Typical examples of certain films which could be used are oriented films of rubber hydrochloride (oriented [1] "Pliofilm," such as "Snug-Pak") or of vinylidene chloride (oriented "Saran," "Cryovac"), biaxially oriented irradiated polyethylene, biaxially oriented polypropylene, heat shrinkable nylon, heat shrinkable polyester ("Mylar"), etc., and including any high shrink energy materials or polymers, which are heat shrinkable by reason of their oriented internal structure commonly induced by stretching the same unidirectionally or multidirectionally while heated or supercooled. Obviously, the "orienting" of such films may be done by mechanical, pneumatic, or other methods for expanding or stretching the films, or other means of cross-linking the molecular arrangement, comprising chemical reactions, irradiating, etc.

The selection of films of suitable shrinkability, suitable shrinkage temperature, and suitable strength will be dictated primarily by the nature of the container or contents, and the temperature to which the localized area may be heated when the sealing of the closure to the container is effected, and such selection may be readily made. For a more extended disclosure of the type film and conditions used herein, reference is made to the above prior heat shrinkable film art.

With the foregoing and other objects in view as will appear from a reading of the following specification and claims, the invention resides in the novel arrangement and combination of parts and in the details of construction and process of manufacture herein described and claimed, it being understood that changes in the precise embodiment of the invention may be made within the scope of what is claimed without departing from the spirit of the invention. It will be further understood that the invention is susceptible of embodiment in many and various forms in order to provide a single closure, with an optional protective closure, for either a single container, but preferably for a series of containers simultaneously. Some of these embodiments are illustrated in the accompanying drawing, but the structural details of the apparatus or particular steps of the method herein set forth may be varied widely to suit particular purposes and still remain within the inventive concept.

---

[1] Registered trademarks: "Pliofilm," of Goodyear Tire & Rubber Co.; "Snug-Pak," of Tee-Pak, Inc.; "Saran" Wrap, of Dow Chemical Co.; "Cryovac," of W. R. Grace & Co.; "Mylar" of E. I. du Pont & Co.

Referring broadly to the figures:

FIG. 1 is a schematic view illustrating the various stations of a sealing or capping machine closing a series of containers simultaneously, and applying an optional protective or outer cover thereto.

FIG. 1A is an exploded view of the container hermetically sealed by the plastic film, and an outer protective snap-on cover about to be applied, as occurs at optional Station 4.

FIG. 2A is an enlarged detail view of Station 1 taken on the line 2—2 of FIG. 1, showing the cutting mechanism for the film in inoperative position, while FIG. 2B is a detailed view in operative position showing the cut film positioned on a filled container.

FIG. 3A is a detail view of Station 2 taken on line 3—3 of FIG. 1, and illustrates the multiple sealing heads or film skirt heating means in inoperative position, while FIG. 3B illustrates one of the heads in sealing position.

FIG. 4 is a view of Station 3 taken on line 4—4 of FIG. 1, and illustrates the optional hot plate or center heat shrinking means for shrinking the central or interior area of the film cover.

FIG. 5 shows a modified type of sealing head, while FIG. 6 is a detailed view taken on line 6—6 thereof showing the container to be sealed.

FIG. 7 is a modified view of Station 1 showing as an actuating means, for example, a floor supported air or hydraulic cylinder which is applicable in the same manner to each of the other stations.

Figure 8:
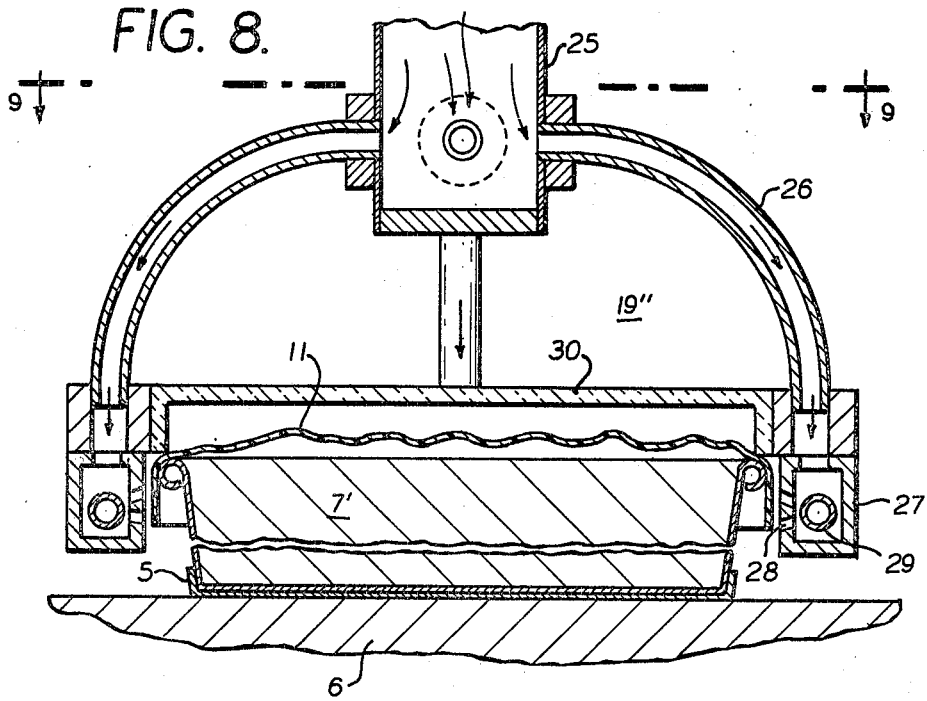
FIG. 8 is a modified form of sealing head, preferably for rectangular containers.

This invention comprises four main stations, as follows:

Station 1, indicated generally by numeral 1, for cutting the film and tacking it to the filled container.

Station 2, indicated by numeral 2, for applying heat to the film skirt (and optionally to the center of the film).

Station 3, indicated by numeral 3, for, optionally, applying heat to the center of the film.

Station 4, indicated by numeral 4, for, optionally, applying an outer aluminum, paper, etc., protective cover to the underlying fragile film cover.

Conventional container dispensers (not shown) deposit empty containers 7 in properly spaced retaining seats or registering areas 5 on intermittently moving conveyor or transfer belt 6 to be moved through a conventional filling area (not shown) before entering the above sealing machine indicated by numerals 1 to 4. As containers 7 pass through the dispenser, preferably the topmost point of the rim may rub a cake of wax or receive a wax spray or some other appropriate adhesive, to acquire a very light coating 7'. Alternatively, film feed roller 12', if desired, may dip into a wax bath and apply a thin coating to the entire film or as 2 stripes on each side of the film. These wax applying means are conventional and therefore are not shown. Obviously, wax is not necessary, and the weight of the film or its clinging tendency due to static may be relied upon as the container is moved from Station 1 to Station 2, as appears later. Clearly, if the container itself is made of a waxed paper, or plastic, or the metal has a coating thereon which becomes tacky with heat, no additional wax or temporary film fastening means will be necessary.

Referring particularly to FIG. 1, after a row of containers 7 has been filled, belt 6 moves the row of filled containers to the Station 1 of the sealing machine. At this station a shelf 8, which has a number of holes 9 in it, is arranged above the containers. Each container is positioned beneath a corresponding hole, and the diameter of the hole is approximately the same but slightly larger than the diameter of the container top or opening.

The shelf or table 8 serves as a support for a number of gripping devices 10 adapted to grip a web of thin, fragile, heat shrinkable, oriented plastic film 11 used for hermetically sealing the containers, and to pull a predetermined length of film intermittently across the shelf. Gripping devices may be, for example, suction bars, clamping devices, etc., which may be, for example, attached to a set of chains, or cables, etc. The suction bars obviously grab the film by suction, and the clamps grip by frictional force. However, any suitable means for moving the film may be used.

While the grippers are illustrated in FIG. 1 as returning to the starting point beneath the container transfer belt 6, obviously they could return to the starting point between the belt levels or even above the top level of the belt. Also, a single, fast acting reciprocating gripper could be used, or two oppositely moving grippers connected by a rack and pinion construction as described in my application being filed herewith.

The grippers are moved by the chains 10' in such a way, using an intermittent stroke of the chain, that one bar will grip the film at one end of the shelf after the preceding gripper has pulled the film to the other end of the shelf. In addition, feed rolls 12 and 12' may be used under the film reel as well as along the film web. These rolls are driven in synchronization, by a gear arrangement in a conventional manner, to feed precisely the same amount of film as is pulled across the shelf by the grippers, so that there is no drag, nor does any slack accumulate along the film web.

A reciprocating transverse crosshead 13 holds rigidly secured stems having stripper discs 14 at the end and retaining rings 14' spaced an appropriate distance above. Each stripper unit positioned on the crosshead is in line with the holes in the film transfer shelf. Alternate stems carry, in addition, springs 16 to yieldingly force cut-off devices 15 with sharpened edges, heated wire, etc., to cut the film pulled onto the film transfer shelf into a predetermined number of pieces corresponding to the number of containers to be sealed. The discs rigidly carried on the stems serve a 2-fold purpose: First, they strip or force the film, after it has been cut, through the corresponding holes of the shelf so that each piece of film will be positioned on top of each container. Since each disc preferably is provided at its circumference with a ring-shaped heating element 17, the heating element will cause the wax 7 on the rim of the container (or on the film) to soften and become tacky and thereby retain the film on top of the rim of each container as they travel to the Station 2. Obviously, the heating element can be devised in any suitable way as long as its temperature is sufficient to cause tackiness, but not high enough to cause shrinking of the film. The heating element may be heated by steam, hot air, electric resistance, electronically, or in any other suitable manner. Likewise, the top of the rim of the container may be heated directly by steam, etc., to cause the film to become tacky in that limited area of contact without using a heating element on the stripper discs. The cut-off devices may be made in any other suitable manner as long as the film strip is cut into a number of pieces before the stripper discs reach the surface of the film.

The crosshead at Station 1, as well as at Stations 2, 3 and 4, is actuated by a conventional crank mechanism (not shown) being raised and lowered from overhead, or by a floor mounted cylinder as illustrated in FIG. 7. Synchronized with the motion of the crosshead of Station 1 is the movement of the belt 6, and crossheads at Stations 2 and 3 also moving up and down in unison and being actuated in the same manner as the crosshead of Station 1.

The crossheads at all the stations have elongated slots 31 therein (FIG. 2A) through which the stems project. Hence, when different size containers are to be filled, these stems may be shifted by a longitudinal slot to correspond with the different size container as mentioned at the end hereof.

The crosshead 13 at Station 2 carries a number of sealing heads 19 (FIGS. 3A and B) corresponding to the number of containers to be sealed. These sealing heads are designed to direct heat through openings 24, which may be a continuous circular slot or spaced apertures, towards the skirt of the heat-shrinkable film placed on or tacked on the containers at Station 1. The heat will shrink the film skirt first to form a closure while the central area is shielded by the body of the sealing head which is preferably made of hard rubber, asbestos, or other heat insulating material. All the containers are sealed simultaneously.

Station 3 also has a crosshead 13″, with stems carrying at the end thereof discs which are heated by any suitable means. These heated discs are lowered onto the sealed container, and evenly heat shrink the top portion of the film so that wrinkles in the top which may have occurred at Station 2 are eliminated by applying heat evenly across the top of the container.

Station 3 is optional, as mentioned before, since Station 2 may accomplish the additional function performed by Station 3 in the following manner. After the skirt of film 11 is beat shrunk to the side of the container, the blast of hot air or steam from sealing head 19, and as the sealing head is being raised in a continuous movement or with a momentary pause at the appropriate most effective spot, the hot blast may continue to issue from the downwardly directed opening and flow over the central area of the film to shrink the center and make the edge seal even tighter.

An optional fourth station is provided so that an outer protective, preferably snap-on cover 21 can be applied, should this be desirable, to protect the film closure formed on the preceding stations. These covers, preferably of moldable material, such as, aluminum, paper, plastic sheeting, etc., may be dispensed from a stack 22 by a conventional cover dispenser 23.

While FIG. 3A illustrates a sealing head preferably for a circular container, this same type head could be readily reformed for rectangular or other shaped containers.

FIGS. 5 and 6 illustrate a modified form of sealing head 19′ for circular or rectangular containers having a series of spaced apertures 24′ connected to passageway 19b which is in turn connected to a source of heated air or steam through opening 19a. This is a dual purpose sealing head and accomplishes the same function as heads 19 and 20 in that after heat is supplied to the film skirt through openings 24′, a sequence step of applying heat through stem opening 19c to the center of the film is engaged in.

Figure 9:
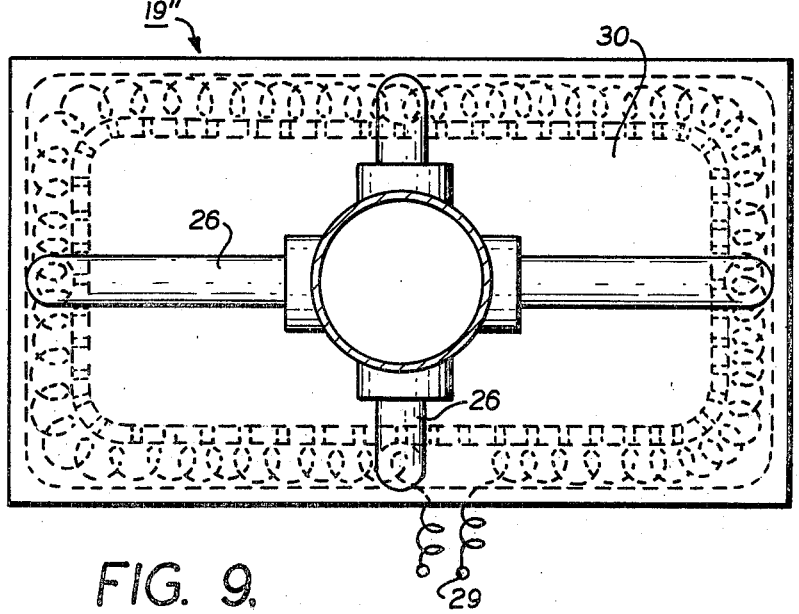
FIG. 9 is a plan view taken on the line 9—9 of FIG. 8.

FIGS. 8 and 9 illustrate a further modified form of sealing head 19″ specifically formed for sealing rectangular containers. This head uses a centrally located manifold or tube 25 having a series of conduits or tubes 26 connecting the manifold to an encircling channel 27 which has apertures or slots 28, and heating means 29 therein. To shield the central area of the film, at least temporarily, an insulation cover 30 is part of the head. The square containers 7′ are carried from station to station by belt 6 just as are containers 7.

The sequence of operation of the sealing machine would be as follows: A row of containers having been deposited on the belt and having been filled are moved by the belt to Station 1. During this time interval, a strip of the heat-shrinkable film has been fed by means of the suction bars across the film feed shelf. All the crossheads at all the stations move down in unison. This action (at Station 1) causes the severing means to cut or tear the film on the film transfer shelf into a number of pieces or blanks, each piece then being stripped or forced through one of the holes in the feed shelf by the stripper discs, and finally being positioned or tacked to the rim of the container because of the preferred heated ring provided on the disc.

As all the crossheads are raised to the "up" position, the feed belt moves the row of containers to Station 2, while a suction bar pulls a web of film again across the feed shelf, and a fresh row of containers is moved into position at Station 1. Obviously, if the film blanks are lightly tacked by wax or some other means to the rim, they cannot be displaced by the movement.

The crossheads are again lowered, and the sealing heads at Station 2 apply heat the film skirts to cause the film to simultaneously form covers and at the same identical time seal the containers. At Station 1 the process of cutting the film and tacking it to the containers is repeated as previously described.

Now the crossheads are raised again, and the feed belt moves the sealed containers to Station 3. Here on the down stroke of the crosshead at Station 3, the center of the film on top of the container is smoothed out by the heated discs of Station 3 and, if desirable, additional sealing of the film to the container rim is accomplished.

The container thus sealed is moved to optional final Station 4 where outer protective covers 21 are snapped over the sealed containers by means of conventional capping devices. At the other stations of the machine, the actions take place as previously described. After the outer covers have been attached, the containers are discharged from the sealing machine.

It is evident that the number of containers per row may be varied from a single container to 10, 25, 50 containers or more, depending on the width of the machine. Also, with a given machine, a greater number of containers with a small diameter, or a smaller number of containers with a large diameter, may be sealed, feeding the same length of film strip. The machine is devised in such a way, that a variety of container sizes can be accommodated simply by making the position of the stems on the crossheads adjustable side-ways through one (or more) centrally located elongated slots (see FIG. 2A), and by making interchangeable various types of film feed shelves with different size openings, differently spaced, different size stripper discs, sealing heads, etc.

From the above it is evident that a great number of containers can be efficiently sealed by this machine employing the above novel construction and method.

The embodiments of the invention in which an exclusive property or privilege is claimed are defined as follows:

1. A method for simultaneously forming covers and sealing a plurality of filled containers comprising:
  (a) providing a shelf having a plurality of holes therein, said holes approximating the diameter of the top of said containers;
  (b) positioning said containers beneath said holes, each container being aligned under a corresponding hole;
  (c) drawing a web of heat shrinkable, plastic film over said shelf covering said holes;
  (d) severing the web while on said shelf into pieces corresponding to the number of said containers, each of said pieces being large enough to cover the container's mouth with an edge skirt extending beyond the rim of container's mouth;
  (e) transferring the severed pieces of film through said holes;
  (f) positioning each piece of film over the corresponding container thereby covering the mouth of each container;
  (g) restraining each piece of film against the rim of the mouth of each container so that the edge of the film extending beyond the container's rim is unrestrained; and,
  (h) heating the edges of the film pieces to shrink the edges into a tight seal beneath the rims of the containers thereby providing a sealed cover on each container.

2. The method of claim 1 including subsequent to step (h) the step of contacting the central areas of each cover with a heated surface thereby providing a taut cover.

3. An apparatus for simultaneously forming a closure and sealing a container with heat shrinkable film comprising:
  (a) conveyor means for carrying a filled container;
  (b) a stationary shelf having holes therein over which film may be drawn; said shelf being positioned over said conveyor so that said containers can pass thereunder, and said holes being approximately the same diameter as the mouth of the containers;
  (c) means for cutting blanks from film drawn over said shelf;
  (d) means associated with said cutting means for transfering said blanks through said holes and subsequently positioning said blanks over said containers;
  (e) means for applyng heat selectively to said blanks while positioned over said containers so the selected areas of the blank will shrink and form tight closures for said containers.

4. The apparatus of claim 3 including contact means for applying heat to the centers of the film blanks.

5. The apparatus of claim 3 wherein the means for applying heat selectively to said blanks comprises a sealing head having therein:
  (i) a series of spaced apertures for directing a heated gas horizontally towards a container whose upper portion is covered by said head; and,
  (ii) a central aperture for directing a heated gas downwardly upon a container covered by said head.

References Cited

UNITED STATES PATENTS

| | | | |
|---|---|---|---|
| 3,354,614 | 11/1967 | St. Clair et al. | 53—329 XR |
| 3,014,320 | 12/1961 | Harrison | 53—42 |
| 3,354,604 | 11/1967 | Amberg et al. | 53—42 |
| 3,197,940 | 8/1965 | Spangler | 53—329 |
| 3,099,115 | 7/1963 | McKibben et al. | |
| 3,262,245 | 7/1966 | Snow | 53—184 |
| 3,034,271 | 5/1962 | Carpenter et al. | 53—329 |
| 2,920,431 | 1/1960 | Izumi | 53—296 XR |

THERON E. CONDON, Primary Examiner

H. M. CULVER, Assistant Examiner

U.S. Cl. X.R.

53—297, 329